US011797911B2

(12) United States Patent
Perez (10) Patent No.: US 11,797,911 B2
(45) Date of Patent: *Oct. 24, 2023

(54) SYSTEMS, METHODS, AND COMPUTER PROGRAM PRODUCTS FOR PROCESSING PACKAGE DELIVERY EXCEPTIONS

(71) Applicant: United Parcel Service of America, Inc., Atlanta, GA (US)

(72) Inventor: Juan Perez, Milton, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 568 days.

This patent is subject to a terminal disclaimer.

(21) Appl. No.: 16/805,396

(22) Filed: Feb. 28, 2020

(65) Prior Publication Data

US 2020/0202295 A1    Jun. 25, 2020

Related U.S. Application Data

(63) Continuation of application No. 14/578,983, filed on Dec. 22, 2014, now Pat. No. 10,614,407.
(Continued)

(51) Int. Cl.
*G06Q 10/0833* (2023.01)
(52) U.S. Cl.
CPC ............... *G06Q 10/0833* (2013.01)
(58) Field of Classification Search
CPC ................................ G06Q 10/0833
See application file for complete search history.

(56) References Cited

U.S. PATENT DOCUMENTS 7,516,890 B1 *   4/2009   Spremo ............... G06Q 10/087
                                                              705/28
7,624,024 B2    11/2009   Levis et al.
(Continued)

OTHER PUBLICATIONS

R. Zhang, Y. Liu, Y. Zhang and J. Sun, "Fast identification of the missing tags in a large RFID system," 2011 8th Annual IEEE Communications Society Conference on Sensor, Mesh and Ad Hoc Communications and Networks, 2011, pp. 278-286, doi: 10.1109/SAHCN.2011.5984908. (Year: 2011).*
(Continued)

*Primary Examiner* — Ibrahim N El-Bathy
(74) *Attorney, Agent, or Firm* — Shook Hardy & Bacon L.L.P.

(57) ABSTRACT

Embodiments of the present invention provide methods, systems, computer program products, and apparatuses for processing package delivery exceptions. In one embodiment, a method for processing an item delivery exception for an item that is to be delivered by a carrier is provided. The method comprises receiving an exception request associated with the item; notifying a delivery vehicle driver of the exception request; receiving input indicating a unique RFID identifier, wherein the unique RFID identifier identifies an exception RFID tag attached to the item; associating the unique RFID identifier with the unique item identifier; after receiving a request to locate the item, activating an RFID reader array, wherein the RFID reader array is located at a facility associated with the carrier; and based at least in part on the detection of the item by at least one RFID reader of the RFID reader array, calculating an estimated location of the item.

18 Claims, 6 Drawing Sheets

Related U.S. Application Data (60) Provisional application No. 61/920,510, filed on Dec. 24, 2013.

(56) References Cited

U.S. PATENT DOCUMENTS

| | | | | |
|---|---|---|---|---|
| 2005/0237194 | A1* | 10/2005 | VoBa | G08B 13/2417 340/572.1 |
| 2008/0004995 | A1* | 1/2008 | Klingenberg | G06Q 10/083 705/28 |
| 2008/0195246 | A1 | 8/2008 | Tribble et al. | |
| 2009/0037244 | A1* | 2/2009 | Pemberton | G06Q 10/087 705/28 |
| 2009/0303003 | A1 | 12/2009 | Trinh et al. | |
| 2010/0321167 | A1 | 12/2010 | Hashimoto et al. | |
| 2011/0054731 | A1* | 3/2011 | DeRose | G06Q 10/08 701/31.4 |
| 2012/0052879 | A1* | 3/2012 | Wildon | H04L 67/42 455/456.1 |
| 2012/0127976 | A1* | 5/2012 | Lin | G06K 17/0022 340/10.4 |
| 2012/0306628 | A1 | 12/2012 | Singhal | |
| 2013/0234853 | A1* | 9/2013 | H. Kazerouni | G06K 7/10297 340/572.1 |
| 2014/0012804 | A1 | 1/2014 | Gullo et al. | |
| 2014/0258165 | A1 | 9/2014 | Heil | |
| 2015/0081587 | A1 | 3/2015 | Gillen | |
| 2015/0120598 | A1 | 4/2015 | Fadell et al. | |
| 2015/0178675 | A1 | 6/2015 | Perez | |

OTHER PUBLICATIONS

Kong Wa Chiang, Prefix-Randomized Query-Tree Protocol for RFID Systems, 2006, p. 1-3 (Year: 2006).*

Kong, Wa Chiang, "Prefix-Randomized Query-Tree Protocol for RFID Systems", IEEE International Conference on Communications, vol. 4, 2006, pp. 1653-1657.

* cited by examiner

SYSTEMS, METHODS, AND COMPUTER PROGRAM PRODUCTS FOR PROCESSING PACKAGE DELIVERY EXCEPTIONS

CROSS-REFERENCE TO RELATED APPLICATIONS

This application is a Continuation of Non-Provisional application Ser. No. 14/578,983, filed Dec. 22, 2014, titled "Systems, Methods, And Computer Program Products For Processing Package Delivery Exceptions," which claims priority to U.S. Provisional Application Ser. No. 61/920,510, filed Dec. 24, 2013, which are hereby incorporated herein by referenced in their entirety.

FIELD OF THE INVENTION

The present invention is generally related to the delivery of an item. More particularly, the present invention relates to the processing and handling of items associated with delivery exceptions.

BACKGROUND

Generally, a carrier is presented an item from a shipper, transports the item to the destination location, and delivers the item to a consignee address associated with the item. However, for some items the consignee may request a delivery exception. For example, if the consignee is not going to be available when the item is scheduled to be delivered, the consignee may request to pick up the item from a facility associated with the carrier. When the consignee arrives to pick up the item, the consignee would generally prefer the carrier to be able to quickly locate the item within the facility.

Therefore, there is a need for methods, systems, apparatuses, and computer program products to improve the efficiency of processing and handling of items associated with delivery exceptions.

SUMMARY

Embodiments of the present invention are directed to methods, systems, apparatuses, and computer program products for improving the efficiency of processing and handling of items associated with delivery exceptions.

According to one aspect of the present invention, a method is provided for processing an item delivery exception for an item that is to be delivered by a carrier. The method may comprise (a) receiving an exception request associated with the item; (b) notifying a delivery vehicle driver of the exception request; (c) receiving input indicating a unique RFID identifier, wherein the unique RFID identifier identifies an exception RFID tag that has been associated with the item; (d) associating the unique RFID identifier with the unique item identifier; (e) after receiving a request to locate the item, activating an RFID reader array, wherein the RFID reader array is located at a facility associated with the carrier; and (f) based at least in part on the detection of the item by at least one RFID reader of the RFID reader array, identifying an estimated location of the item at the facility.

According to another aspect of the present invention, a system for processing an item delivery exception for an item that is to be delivered by a carrier is provided. The system may comprise one or more storage areas containing a unique item/shipment identifier associated with the item; and one or more computer processors configured to: (a) receive an exception request associated with the item; (b) notify a delivery vehicle driver of the exception request; (c) receive a unique RFID identifier, wherein the unique RFID identifier identifies an exception RFID tag that has been associated with the item; (d) store the unique RFID identifier in association with the unique item/shipment identifier in the one or more storage areas; (e) after receiving a request to locate the item, activate an RFID reader array, wherein the RFID reader array is located at a facility associated with the carrier; and (f) based at least in part on the detection of the item by at least one RFID reader of the RFID reader array, identifying an estimated location of the item at the facility.

According to yet another aspect of the present invention, a non-transitory computer program product for processing an item delivery exception for an item that is to be delivered by a carrier is provided. The computer program product may comprise at least one computer-readable storage medium having computer-readable program code portions embodied therein. The computer-readable portions may comprise (A) an executable portion configured for receiving a plurality of data, wherein said data comprises: (i) a unique item/shipment identifier associated with an item to be delivered by a carrier; and (ii) an exception request associated with the unique item/shipment identifier; (B) an executable portion configured for providing at least a portion of the exception request to a delivery truck driver; (C) an executable portion configured for receiving input comprising a unique RFID identifier, wherein the unique RFID identifier is associated with an exception RFID tag that is attached to the item; (D) an executable portion configured for associating the unique RFID identifier with the unique item/shipment identifier; (E) an executable portion configured to, after receiving a request to locate the item, activate an RFID reader array, wherein the RFID reader array is located at a facility associated with the carrier; and (F) an executable portion configured to calculate an estimated location of the item based at least in part on the detection of the item by at least one RFID reader of the RFID reader array.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Methods, Apparatus, Systems, and Computer Program Products

As should be appreciated, the embodiments may be implemented as methods, apparatus, systems, or computer program products. Accordingly, the embodiments may take the form of an entirely hardware embodiment, an entirely software embodiment, or an embodiment combining software and hardware aspects. Furthermore, the various implementations may take the form of a computer program product on a computer-readable storage medium having computer-readable program instructions (e.g., computer software) embodied in the storage medium. More particularly, implementations of the embodiments may take the form of web-implemented computer software. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, can be implemented by computer program instructions, e.g., as logical steps or operations. These computer program instructions may be loaded onto a general purpose computer, special purpose computer, or other programmable data processing apparatus to produce a machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

In general, the terms computing entity, entity, device, system, and/or similar words used herein interchangeably may refer to, for example, one or more computers, computing entities, computing devices, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

General Overview

Generally, a shipper can ship an item from one location to a consignee at a different location by employing the services of a carrier that operates the carrier system 200. As will be recognized, an item may be a parcel or group of parcels, a package or group of packages, scrap metal banded together, a vehicle part, a box, a crate, a drum, a box or group of boxes strapped to a pallet, and/or the like.

The shipper may initiate the shipping process by entering identifying information into the carrier system 200 which may then be stored in an item data database 240. A shipper may be an individual, a family, a company, an organization, an entity, a department within an organization, a representative of an organization and/or person, and/or the like. In various embodiments, the shipper may access a webpage or portal of a carrier, such as United Parcel Service of America, Inc. (UPS). For instance, the carrier system may transmit a webpage that provides the shipper with an option of logging into an existing account, opening a new account or entering shipping information as a "guest" for a customer pickup and/or delivery of an item. U.S. application Ser. No. 14/025,893, entitled Customer Controlled Management of Shipments and filed on Sep. 13, 2013, describes various processes in which a shipper (and/or consignee) may establish an account and this application is incorporated herein in its entirety by reference.

Once the shipper is identified (e.g., as an account holder or guest), the shipper may initiate a shipment. In various embodiments, the carrier system may then provide a user interface (e.g., browser, dashboard, application) for the shipper to provide shipment data which includes certain details regarding the proposed shipment. In various embodiments, the shipment data may include a name, street address, city, state, postal code, country, telephone number and the like for both the shipper and the consignee. In various embodiments, the user interface may comprise a fillable form with fields including ship-from data and ship-to data. In various embodiments, some of the data fields may be pre-populated. For example, if the shipper logged into a registered account, the address data entered during registration may be pre-populated in the ship-from data fields. In some embodiments, the shipper may also have an associated address book comprising address data for possible consignees (e.g., ship-to addresses).

In addition to ship-to and ship-from data, the shipment data may also include information regarding the shipment itself. For the example, the number of packages, the weight and sizes of the packages and the service level. The service level options may be for example Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like.

Once the shipment data has been entered, validated and stored, the carrier system may generate an item/shipment identifier and a digital representation of a label for use by the shipper for the shipment. In various embodiments, the carrier system 200 sends the digital representation of the label to the shipper computer device such that the label may be printed. In various embodiments, the label may include both human-readable indicia and machine readable indicia such as such as a barcode, a MaxiCode, electronic representation, and/or text (e.g., alphanumeric text).

The unique item/shipment identifier (e.g., 123456789) may be used by the carrier to identify and track the item as it moves through the carrier's transportation network. Such item/shipment identifiers can be affixed to items by, for example, using a label (e.g., sticker) with the unique item/shipment identifier printed thereon (in human and/or machine readable form) or an RFID tag with the unique item/shipment identifier stored therein.

After the item received by the carrier for shipment, the carrier may receive a request seeking a delivery exception for the item. For example, a consignee may call the carrier and ask the carrier to hold an item at a facility associated with the carrier so the consignee (or an agent of the consignee) may pick up the item from the facility. For a carrier that handles a large number of items, the handling and processing of an item associated with such a delivery exception may be complicated, especially if the item is on a delivery vehicle that is already out making the day's deliveries. Various embodiments provide systems and methods that may improve the handling and processing of items associated with delivery exceptions and the ability of carrier personnel to locate items within a facility associated with the carrier.

Various embodiments of the present invention provide methods, apparatus, systems, and computer program products for processing and handling items associated with delivery exceptions. For example, a consignee may request that an item not be delivered to the associated delivery address and instead be retained at or returned to a carrier facility for pickup (e.g., will call). This request may be made prior to a delivery attempt or after an unsuccessful delivery attempt. In some cases, a consignee may submit the exception request via a webpage associated with the carrier while the item is on a delivery vehicle that is en route but before the delivery vehicle driver attempts to deliver the item or after an unsuccessful delivery attempt In some embodiments, a unsuccessful delivery attempt automatically initiates an exception request for a will call pickup.

After receiving the exception request from a consignee, the exception request and/or information associated with the exception request may be sent to a driver computing device associated the delivery vehicle driver assigned to deliver the item. The delivery vehicle driver may then attach an exception radio frequency identification (RFID) tag or other location sensing device to the item indicated by the exception request. In other embodiments, the driver may associate an exception RFID tag or other location sensing device with the item when an unsuccessful delivery attempt is made (e.g., automatic exception request). To facilitate understanding of the inventive concepts, the following paragraphs will describe embodiments of the invention in the context of RFID technology. It should be understood that other radio frequency identification devices, transmitters and location devices could be used in place of the RFID technology (e.g., iBeacons, Gimbal proximity beacons, Bluetooth Low Energy (BLE) transmitters, Bluetooth Smart, NFC transmitters, and/or the like.).

The exception RFID tag may have a unique RFID identifier associated therewith. The delivery vehicle driver may associate the unique RFID identifier with the unique item/shipment identifier associated with the item. The unique exception RFID identifier may then be stored in association with the shipment data associated with the unique item/shipment identifier on a carrier system. The item may then be returned to a facility associated with the carrier. When a consignee attempts to retrieve the item from the facility, a customer service clerk or other carrier personnel may locate the item within the facility by activating an RFID reader array.

System Architecture

Figure 1:
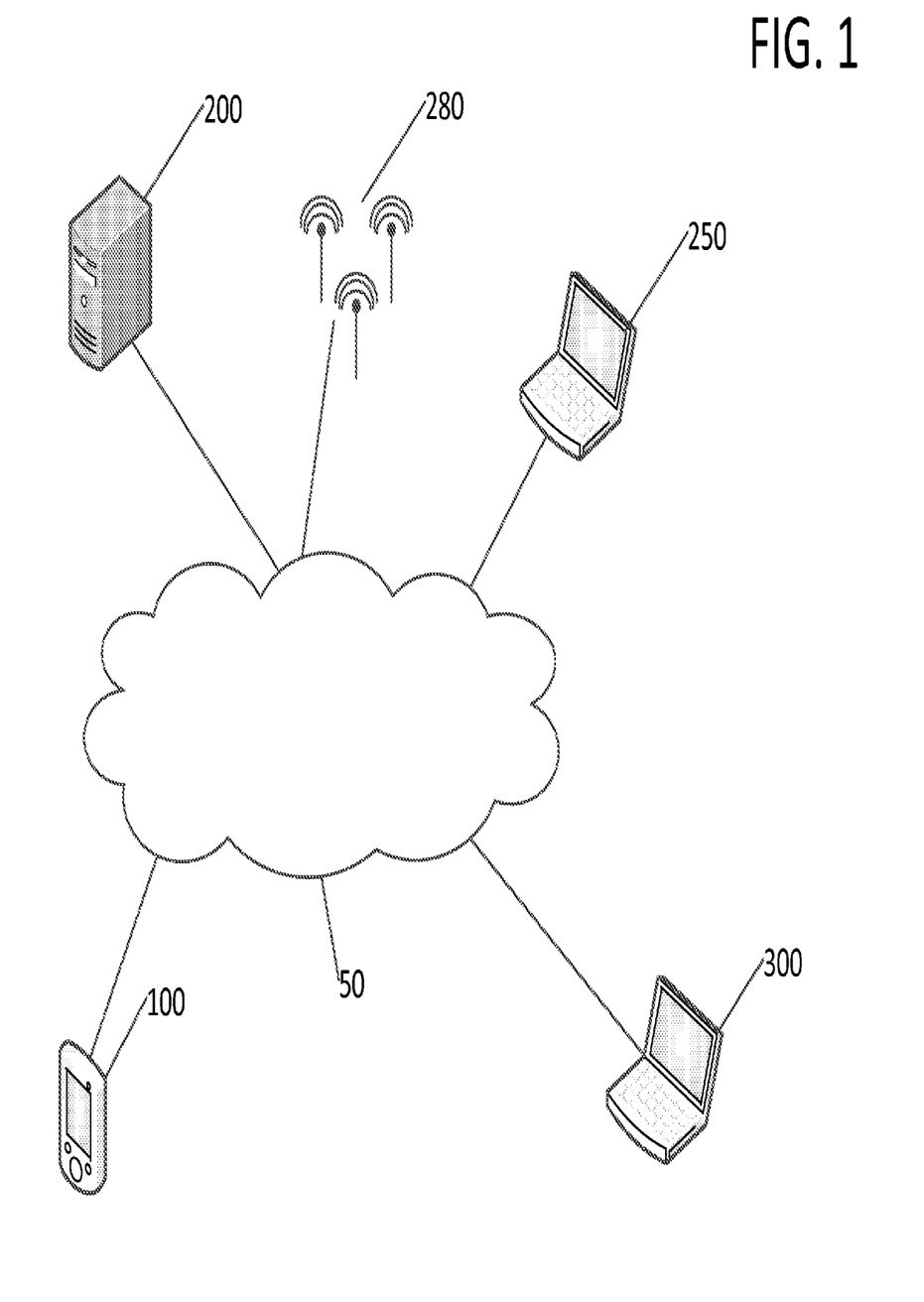
FIG. 1 illustrates one embodiment of a system for processing and handling an item associated with a delivery exception, in accordance with the present invention.

FIG. 1 illustrates one example embodiment of a system architecture that can be used in conjunction with various embodiments of the present invention. The illustrated system includes one or more driver computing devices 100. The illustrated system further includes one or more carrier systems 200, one or more customer service computing devices 250, one or more RFID reader arrays 280, and one or more consignee computing devices 300. The one or more driver computing devices 100, the one or more carrier system 200, the one or more customer service computing device 250, and the one or more consignee computing device 300 may communicate via same or different wireless or wired networks 50 including, for example, a wired or wireless Personal Area Network (PAN), Local Area Network (LAN), Metropolitan Area Network (MAN), Wide Area Network (WAN), or the like.

In various embodiments, the consignee computing device 300 may transmit an exception request indicating a particular exception for an item to the one or more carrier systems 200. The one or more carrier systems may then transmit the exception request and/or information associated with the exception request to a driver computing device 100 (e.g., unique item/shipment identifier, ship-to address, etc.) In response to the transmitted information, the delivery vehicle driver may attach an exception RFID tag to the item indicated by the exception request. Thereafter, the driver (via the computing device 100) may capture and transmit the unique item/shipment identifier associated with the item and the unique RFID identifier associated with the exception RFID tag to the one or more carrier systems 200. The one or more carrier systems 200 may then store the unique exception RFID identifier in association with the item data associated with the unique item/shipment identifier stored in the one or more carrier systems 200. In some cases, the item may already be associated with an RFID tag. In which case, the driver may not attach a second RFID tag (e.g., an exception RFID tag) and may instead transmit the identifier associated with this existing RFID tag to the carrier system 200.

After the item has been returned to the facility, input initiating an item location request may be received by the customer service computing device 250. After the item initiation request has been initiated, the one or more customer service computing devices 250 or the one or more carrier systems 200 may activate the RFID reader array 280 to determine the location of the item within the facility. After the item has been located and/or presented to the consignee, the customer service computing device 250 may receive input indicating the item has been located and/or presented to the consignee.

The driver computing device 100, the carrier system 200, the customer computing device 250, the RFID reader array 280, and the consignee computing device 300 will now each be discussed in detail below herein.

Driver Computing Device 100

Figure 2:
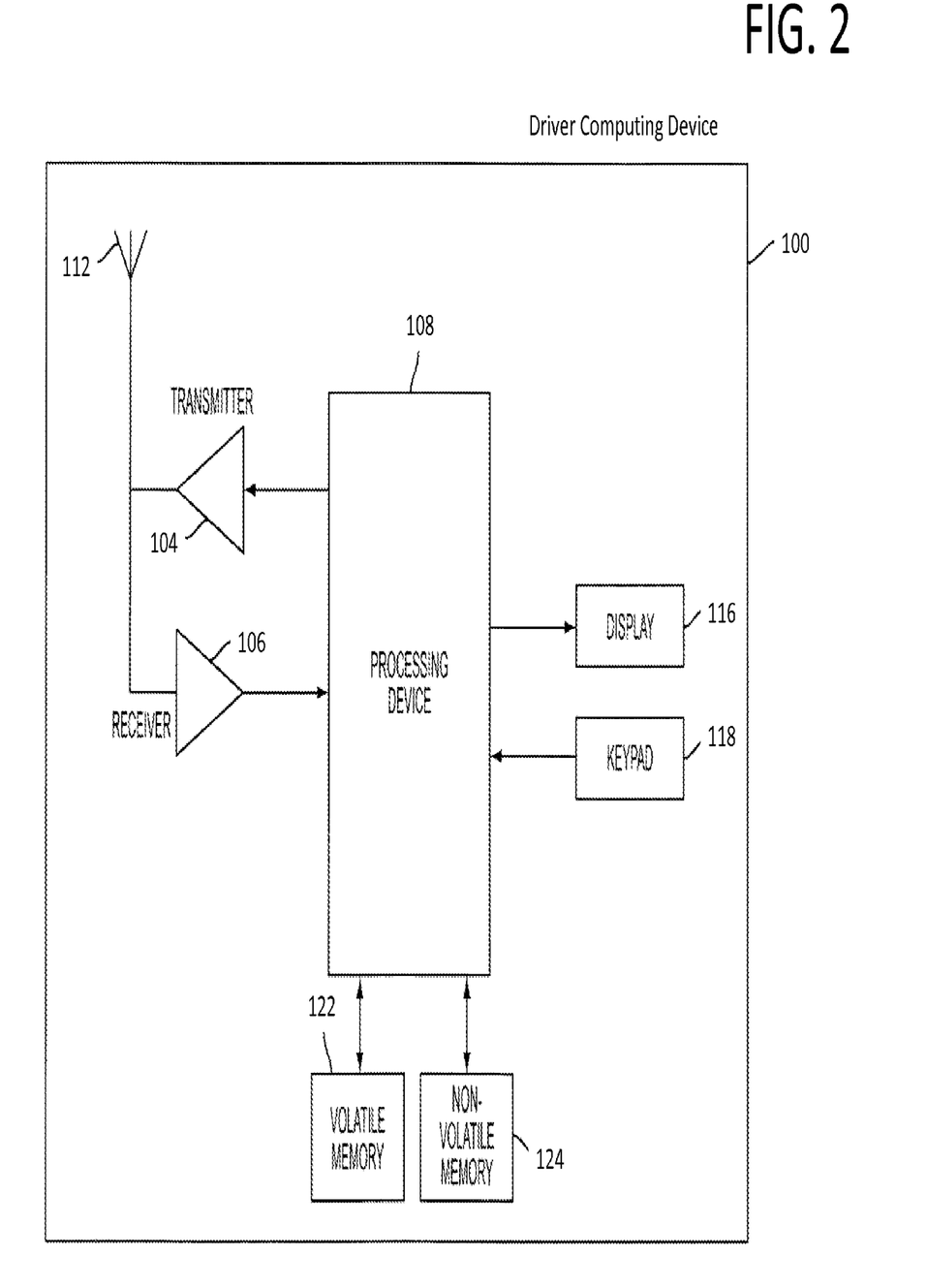
FIG. 2 is a schematic diagram of a driver computing device that may be used by a delivery vehicle driver, in accordance with various embodiments of the present invention.

FIG. 2 provides an illustrative schematic of a representative driver computing device 100 that can be used in connection with various embodiments of the present invention. In the embodiment shown in FIG. 2, the driver computing device 100 is may be a handheld computing device. In various embodiments, the driver computing device may be any handheld electronic device, such as a pocket PC, personal digital assistant ("PDA"), handheld computer, smartphone, portable media player, laptop, pager, converged device, handheld game console, personal navigation device, other portable computing device, and the like—including both wireless and wireline devices. The embodiment of a driver computing device 100 shown in FIG. 2 includes an antenna 112, a transmitter 104, a receiver 106, and a processing device 108, e.g., a processor, controller, or the like, that provides signals to and receives signals from the transmitter 104 and receiver 106, respectively. The processing device 108 may be configured to perform various operations related to the methods described below with regard to FIG. 5. For example, the processing device 108 may be configured to perform various operations related to receiving at least a portion of an exception request, receiving input comprising a unique item/shipment identifier and/or a unique exception RFID identifier, and transmitting information to the carrier system 200, such as a unique item/shipment identifier and/or a unique exception RFID identifier.

The signals provided to and received from the transmitter 104 and the receiver 106, respectively, may include signaling information in accordance with an air interface standard of applicable wireless systems. In this regard, the driver computing device 100 may be capable of operating with one or more air interface standards, communication protocols, modulation types, and access types. More particularly, the driver computing device 100 may operate in accordance with any of a number of second-generation ("2G") communication protocols, third-generation ("3G") communication protocols, fourth-generation ("4G") communication protocols and/or the like. Further, for example, the driver computing device 100 may operate in accordance with any of a number of different wireless networking techniques, including Bluetooth, IEEE 802.11 ("Wi-Fi"), 802.16 ("WiMAX"), ultra wideband ("UWB"), and/or the like. Via these communication standards and protocols, the driver computing device 100 can communicate with the carrier system 200, the customer service computing device 250 and/or the consignee computing device 300. Additionally, the driver computing device 100 may use these communication standards and protocols to communicate with various entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The driver computing device 100 can also download changes, add-ons, and updates, for instance, to its firmware, software (e.g., including modules), and operating system.

According to one embodiment, the driver computing device 100 may include a location determining device and/or functionality. For example, the driver computing device 100 may include a Global Positioning System (GPS) module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The driver computing device 100 may also comprise a user interface (that can include a display 116 coupled to a processing device 108) and/or a user input interface (coupled to the processing device 108). The user input interface can comprise any of a number of devices allowing the driver computing device 100 to receive data, such as a keypad 118, a touch display (not shown), barcode reader (not shown), radio frequency identification ("RFID") tag reader (not shown), or other input device. In embodiments including a keypad 118, the keypad 118 can include the conventional numeric (0-9) and related keys (#, *), and other keys used for operating the driver computing device 100 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Although not shown, the driver computing device 100 may also include a battery, such as a vibrating battery pack, for powering the various circuits that are required to operate the driver computing device 100, as well as optionally providing mechanical vibration as a detectable output.

The driver computing device 100 can also include volatile memory 122 and/or non-volatile memory 124, which can be embedded and/or may be removable. For example, the non-volatile memory may be embedded or removable multimedia memory cards ("MMCs"), secure digital ("SD") memory cards, Memory Sticks, EEPROM, flash memory, hard disk, or the like. The memory can store any of a number of pieces or amount of information and data used by the driver computing device 100 to implement the functions of the driver computing device 100. For example, the volatile and non-volatile memory can be used to temporarily or permanently store input from the carrier system 200. The memory can also store content, such as computer program code for an application and/or other computer programs. For example, the memory may store computer program code for instructing the processing device 108 to perform operations discussed above and below with regard to FIG. 5, such as receiving at least a portion of an exception request, receiving input such as a unique item/shipment identifier and/or a unique RFID identifier, transmitting information to the carrier system 200, such as a unique item/shipment identifier and/or a unique RFID identifier, receiving a delivery route, displaying the delivery route to the delivery vehicle driver and/or the like.

Carrier System 200

Figure 3:
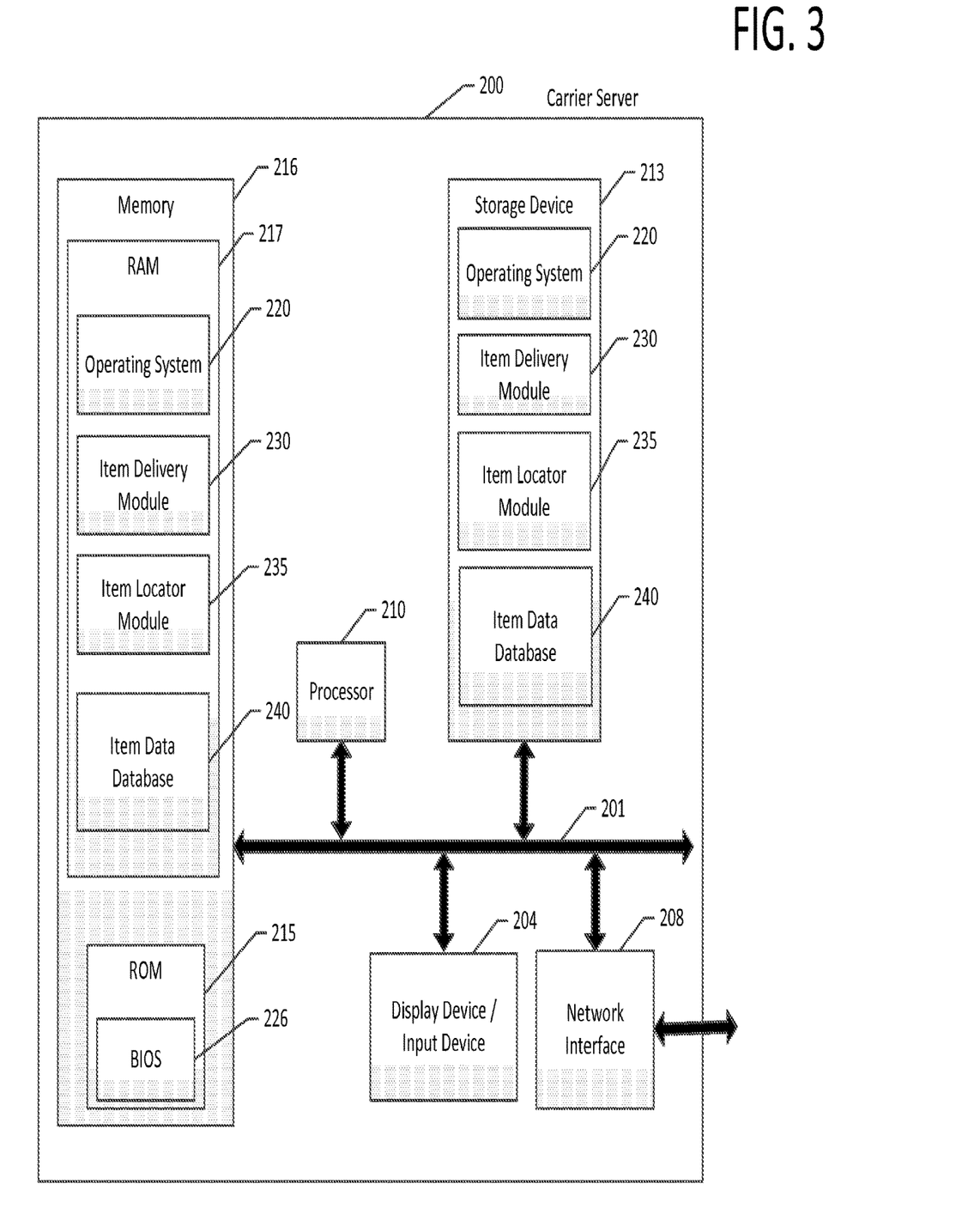
FIG. 3 is a schematic diagram of a carrier system, in accordance with various embodiments of the present invention.

FIG. 3 provides a schematic diagram of an embodiment of a carrier system 200 that may be used in connection with embodiments of the invention. In general, the term "system" may refer to, for example, one or more computers, computing entities, computing devices, mobile phones, gaming consoles (e.g., Xbox, Play Station, Wii), desktops, tablets, notebooks, laptops, distributed systems, servers or server networks, blades, gateways, switches, processing devices, processing entities, set-top boxes, relays, routers, network access points, base stations, the like, and/or any combination of devices or entities adapted to perform the functions, operations, and/or processes described herein. The carrier system 200 includes a processor 210, such as one or more processing elements, which may include complex programmable logic devices (CPLDs), microprocessors, multi-core processors, coproces sing entities, application-specific instruction-set processors (ASIPs), and/or controllers or other processing devices or circuitry. The term circuitry may refer to an entirely hardware embodiment or a combination of hardware and computer program products. Thus, the processor 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing steps or operations according to embodiments of the present invention, such as the embodiment illustrated in FIG. 5, when configured accordingly. The processor 210 is used to execute software instructions for carrying out the defined steps of the method of the various embodiments of the present invention. The processor 210 communicates using a data bus 201 that is used to convey data and program instructions, typically, between the processor and memory 216.

The carrier system 200 further includes memory 216, which may comprise nonvolatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. In various embodiments, memory 216 includes both read only memory (ROM) 215 and random access memory (RAM) 217. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include the item delivery module 230 and/or the item locator module 235. An example database that, in various embodiments, may be stored in memory 216 is an item data database 240 that comprises data associated with items to be delivered and/or that have been delivered via the carrier's transportation network. The term database, database instance, database management system, and/or similar terms used herein interchangeably may refer to a structured collection of records or data that is stored in a computer-readable storage medium, such as via a relational database, hierarchical database, and/or network database.

In at least one embodiment, the carrier system 200 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor 210. Thus, the databases, database instances, database management systems, data, applications, programs, program modules, scripts, source code, object code, byte code, compiled code, interpreted code, machine code, executable instructions, and/or the like may be used to control certain aspects of the operation of the carrier system 200 with the assistance of the processor 210 and operating system 220, such as the item delivery module 230 and/or the item locator module 235.

In various embodiments, memory 216 can be considered primary memory such as RAM memory or other forms which retain the contents only during operation, or it may be a non-volatile memory, such as ROM, EPROM, EEPROM, FLASH, or other types of memory that retain the memory contents. In some embodiments, the disk storage may communicate with the processor 210 using an I/O bus instead of a dedicated bus 201. The memory 216 could also be secondary memory, such as disk storage, that stores a relatively large amount of data. The secondary memory may be a floppy disk, hard disk, compact disk, DVD, or any other type of mass storage type known to those skilled in the computer arts. The memory may also comprise any application program interface, system, libraries and any other data by the processor to carry out its functions. ROM 215 is used to store a basic input/output system 226 (BIOS), containing the basic routines that help to transfer information between components of the carrier system 200, including the item delivery module 230, the item locator module 235, the item locator database 240 and/or the operating system 220.

In addition, the carrier system 200 includes at least one storage device 213, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 213 is connected to the system bus 201 by an appropriate interface. It is important to note that the computer-readable media described above could be replaced by any other type of computer-readable media known in the art. Such media include, for example, memory sticks (e.g., USB memories), magnetic cassettes, flash memory cards, digital video disks, and Bernoulli cartridges.

A number of program modules may be stored by the various storage devices and within RAM 217. Such program modules include the operating system 220, the item delivery module 230 and/or the item locator module 235. Those skilled in the art will appreciate that other modules may be present in RAM 217 to effectuate the various embodiments of the present invention. Furthermore, rather than program modules, the item delivery module 230 and/or the item locator module 235 may comprise stand-alone computers connectively coupled to the carrier system 200.

Also located within the carrier system 200 is a network interface 208, for interfacing and communicating with other elements of a computer network, such as by communicating data, content, information, and/or similar terms used herein interchangeably that can be transmitted, received, operated on, processed, displayed, stored, and/or the like. For instance, the carrier system 200 may be in communication with one or more driver computing devices 100, one or more customer service computing devices 250, RFID reader array 280, and/or one or more consignee computing devices 300. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier system 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

Various information may be input by a user to the carrier system 200 via the network interface 208 and/or input/output device 204. This input information may include information related to items to be delivered, information related to delivery exceptions, information related to items to be located within the facility, information related to an item that has been detected by one or more RFID readers of the RFID reader array 280, or other information. This input information may vary, however, depending on the configuration and informational requirements of the carrier system 200.

As mentioned above, the carrier system 200 also includes an input/output device 204 for receiving and displaying data. The carrier system 200 may include or be in communication with one or more input elements, such as a keyboard input, a mouse input, a touch screen/display input, audio input, pointing device input, joystick input, keypad input, and/or the like, as indicated by input/output device 204. The carrier system 200 may also include or be in communication with one or more output elements, as indicated by input/output device 204, such as audio output, video output, screen/display output, motion output, movement output, and/or the like.

The carrier system 200 is configured to facilitate the delivery of one or more items to a consignee. The carrier system 200 may further be configured to receive one or more exception requests each seeking a delivery exception associated with one or more items. The carrier system 200 may then transmit at least a portion of the information associated with the exception request (e.g., a unique item/shipment identifier) to a driver computing device 100 and receive from the driver computing device a unique exception RFID identifier associated with a unique item/shipment identifier associated with the item indicated in the exception request. The carrier system may then store the unique exception RFID identifier in association with data associated with the unique item/shipment identifier, possibly in the item data database 240. After receiving an item locator request, possibly via the customer service computing device 250, the carrier system 200 may activate the RFID reader array 280 to determine the location of the item. The carrier system 200 may then provide the item location to the customer service computing device 250.

Those skilled in the art will recognize that many other alternatives and architectures are possible and can be used to practice various embodiments of the invention. The embodiment illustrated in FIG. 3 can be modified in different ways or incorporated within a network and be within the scope of the invention. For example, one or more components of the carrier system 200 may be located remotely from other carrier system 200 components, such as in a distributed system. Furthermore, one or more of the components may be combined and additional components performing functions described herein may be included in the carrier system 200. Thus, the carrier system 200 can be adapted to accommodate a variety of needs and circumstances.

Customer Service Computing Device 250

In one embodiment, the customer service computing device 250 may include one or more components that are functionally similar to those of the carrier system 200. For example, in one embodiment, the customer service computing device 250 may include one or more processing elements, one or more display device/input devices, volatile and non-volatile storage or memory, and/or one or more communications interfaces. The customer service computing device 250 may also comprise various other systems, such as an item packing system for assisting shippers in picking and packing items, an item receiving system for receiving an item from a shipper, an item pick up system for providing an item to a consignee who is picking up the item, and a variety of other systems and their corresponding components. In particular, the customer service computing device 250 may include components configured to initiate an item locator request, receive the location of an item within a facility associated with the carrier, receive input indicating the item has been located and/or presented to the consignee, and/or the like. In various embodiments, the customer service computing device 250 may be a stand-alone computing device in communication with at least the carrier system 200. In other embodiments, the customer service computing device 250 may be a thin client connected to the carrier system 200.

In yet other embodiments, the customer service computing device 250 may include one or more components that are functionally similar to those of the driver computing device 100. For example, in one embodiment the customer service computing device 250 may include one or more processing elements, one or more display device/input devices, volatile and nonvolatile storage or memory, an antenna, a transmitter, and/or a receiver. In various embodiments a customer service computing device 250 may be a handheld computing device. In various embodiments, the customer service computing device 250 may be any one or more computers, computing entities, computing devices, mobile phones, gaming consoles (e.g., Xbox, Play Station, Wii), desktops, tablets, notebooks, laptops, distributed systems, servers or server networks, blades, gateways, switches, processing devices, processing entities, set-top boxes, relays, routers, network access points, base stations, the like, and/or any combination of devices or entities adapted to perform the functions, operations, and/or processes described herein.

RFID Reader Array 280

Radio frequency identification (RFID) is an information acquisition technology that uses radio waves rather than optics to capture and transmit data. In some aspects, RFID operates as a form of labeling where electronic labels or tags are programmed with unique information and attached to objects to be identified or tracked. The tag may also be called a transponder, an expression which is derived from TRANSmitter/resPONDER and, in some cases, the term tag is used for low-frequency (e.g. 125 kHz), whereas the term transponder is used for high-frequency (e.g. 13.56 MHz and 2.45 GHz) tags. But for purposes of this application the terms tag and transponder are used interchangeably.

RFID systems are generally comprised of transponders (a/k/a "tags"), a transmitter to provide energy to the tags, a receiver to receive transmissions from the transponders, and a computer system to process the received information. The transmitter and receiver may be combined into a single device often referred to as an interrogator or reader. The complexity of the reader can vary considerably, depending on the type of tag used and the function to be fulfilled. In general, a reader has radio circuitry to communicate with a tag, a microprocessor to check and decode the data and implement a protocol, a memory to store data and one or more antennas to receive the signal. The reader may be configured such that each reader has a predetermined range within which the reader can detect tags. For example, a reader may be configured to detect tags within a 5, 10, or 15 meter radius of the reader. The range in which a reader may detect a tag is herein referred to as a read range.

Figure 4A:
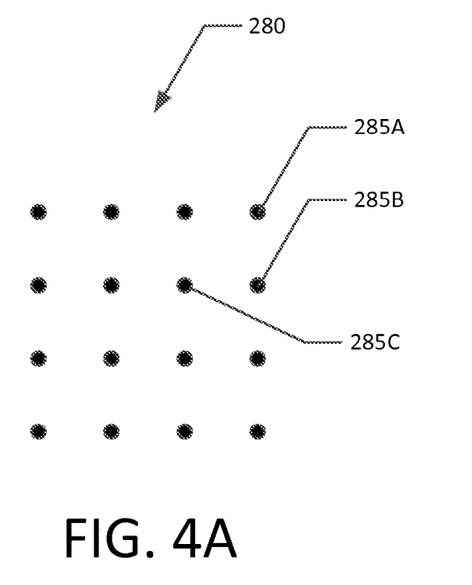
FIGS. 4A-4C illustrate three example RFID reader arrays that may be used in accordance with the present invention.
Figure 4B:
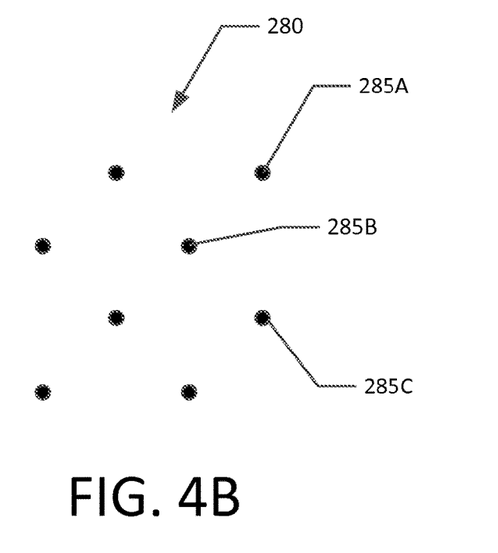
Figure 4C:
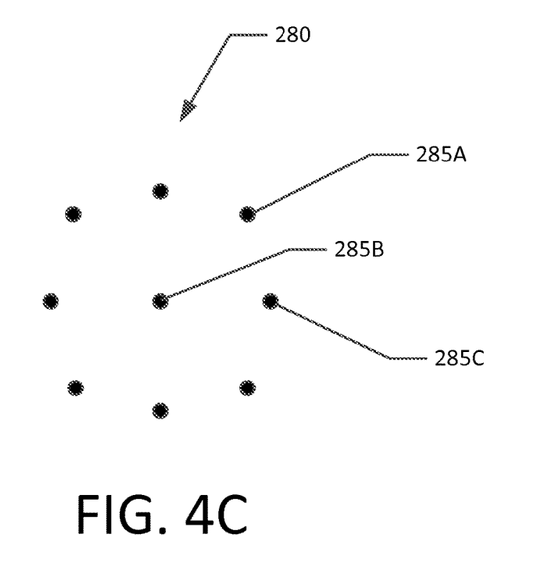

FIGS. 4A, 4B, and 4C show three sample RFID reader arrays 280 that may be used in a facility, in accordance with various embodiments of the present invention. Although FIGS. 4A, 4B and 4C illustrate symmetric arrangements of RFID readers, this is not a requirement and the RFID readers may be dispersed in any desired arrangement. The distance between two RFID readers 285 within the RFID reader array 280 may depend on the read range of each RFID reader 285. For example, the RFID reader array 280 may be configured such the majority of the space within the facility is within the range of at least one RFID reader 285. In some embodiments, the RFID reader array 280 may be configured such the majority of the space within the facility is within the range of at least two or three RFID readers 285. In other embodiments, one or more RFID readers may only be positioned proximate storage areas. In various embodiments, the RFID reader array 280 may also comprise an RFID reader 285 mounted within at least one delivery vehicle associated with the facility.

In various embodiments, each RFID reader 285 may be in communication with a computing device (e.g., carrier system 200, customer service computing devices 250, etc.) for activating the RFID reader 285 upon receiving a trigger and/or for processing the tag response signals received by the RFID reader 285. For example, each RFID reader 285 comprises a microprocessor configured to activate the RFID reader 285 and/or process signals received by the RFID reader 285. In some embodiments, more than one RFID reader 285 may be in communication with a computing device for activating the more than one RFID reader 285 upon receiving a trigger and/or for processing the tag response signals received by the more than one RFID reader 285. In various embodiments, the computing device may be part of the processing of the tag response signals or all of the processing of the received tag response signals. The computing device may further be in communication with the carrier system 200 and may transmit the processed or unprocessed information related to the received tag response signals to the carrier system 200.

In various embodiments, the RFID reader array 280 may be activated by a trigger associated with the initiation of a tag locator request. When the RFID reader array 280 is activated, each RFID reader 285 transmits a radio frequency signal, which prompts an RFID tag within a pre-defined geographical range of the RFID interrogator 285, or the read range, to collect and store data or upload data from the memory of the RFID tag to the memory of the reader 285 or a device in communication with the reader 285, such as the carrier system 200 or other computing device. In various embodiments, each RFID reader 285 transmits a radio frequency signal in response to a signal triggering event, such as the initiation of an item locating request. In other embodiments, the RFID reader array 280 may be constantly, regularly, or periodically activated. In some embodiments, the location of the item may only be determined after a location request is initiated.

As noted above, the exception RFID tag may have a unique RFID identifier associated therewith and the unique RFID identifier may be associated with (or be the same as) the item's unique item/shipment identifier. The RFID reader array 280, once activated to locate an item within the facility, may use polling and/or random access techniques to attempt communication with the specific exception RFID tag (and the associated item). The carrier system 200 can then identify which RFID readers successfully communicate with the exception RFID tag. For example, one or more RFID readers within the array may communicate with the exception RFID tag when it is located within the read range of respective RFID readers. In some embodiments, the RFID tag response signal (e.g., communication) may include the unique RFID identifier or other information associated with the unique RFID identifier. The reception of the tag response signal by a reader 285 constitutes a detection of the tag. In some embodiments, the RFID reader 285 may transmit information related to the detection of the exception RFID tag to the carrier system 200 or another computing device. In various embodiments, such information may comprise the time delay between the transmission of the interrogating signal and the detection of the tag, the strength of the received exception RFID tag response signal, information identifying the RFID reader 285, and/or other information related to the detection of the tag by the reader 285.

In various embodiments, the carrier system 200 may use the information related to the detection of the exception RFID tag to determine the location of the item. For example, the carrier system 200 may be configured to use an identifier associated with an RFID reader 285 that received a tag response signal and the time delay and/or signal strength of the received tag response signal for at least one RFID reader 285 that detected the tag to determine the proximity of the item to the particular RFID reader 285. In some embodiments, the carrier system 200 may be configured to use a triangulation algorithm to determine the location of the item. In some embodiments, a computing device other than the carrier system 200, and in communication with the carrier system 200, the RFID reader array 280, and/or the customer server computing device 250, may be configured to determine the location of the item based on the detection of the tag by one or more RFID readers 285. In some embodiments, the customer service computing device 250 may be configured to determine the location of the item based on the detection of the tag by one or more RFID readers 285.

Consignee Computing Device 300

In one embodiment, the consignee computing device 300 may include one or more components that are functionally similar to those of the carrier system 200. For example, in one embodiment, the consignee computing device 300 may include one or more processing elements, one or more display device/input devices, volatile and non-volatile storage or memory, and/or one or more communications interfaces. In various embodiments, the consignee computing device 300 may be one or more computers, computing entities, computing devices, mobile phones, gaming consoles (e.g., Xbox, Play Station, Wii), desktops, tablets, notebooks, laptops, distributed systems, servers or server networks, blades, gateways, switches, processing devices, processing entities, set-top boxes, relays, routers, network access points, heads up displays, base stations, the like, and/or any combination of devices or entities adapted to perform the functions, operations, and/or processes described herein.

The consignee computing device 300 may be configured to transmit an exception request to the carrier system 200 or another computing device in communication with the carrier system 200. In various embodiments, the consignee computing device 300 may be configured to transmit an exception request via a website associated with the carrier, an online portal associated with the carrier, an application (or "app") associated with the carrier, an email, and/or the like.

System Operation

As indicated above, various embodiments of the carrier system 200 may operate various modules (e.g., modules 230, 235). In various embodiments, various modules (e.g., modules 230 and/or 235) operating on the carrier system 200, a driver computing device 100, customer service computing device 250, and/or other computing device may access, query, and/or write to various databases (e.g., database 240). In various embodiments, the item delivery module 230 is configured to facilitate delivery of one or more items by one or more delivery vehicle drivers and/or the handling and processing of exception requests and/or items associated with exception requests. In various embodiments, the item locator module 235 is configured to trigger an RFID reader array 280 located at a facility associated with the carrier after the initiation of an item location request. The item locator module 235 may be configured to determine the location of the item based on the detection of an exception RFID tag associated with the item and/or provide the location of the item to the customer service computing device 250. In various embodiments, the item data database 240 may be configured to store information associated with items to be delivered and/or that have been delivered by the carrier. For example, the item data database 240 may store shipment data, such as a shipper, shipper address, consignee, consignee address, handling instructions, and/or other information associated with the unique item/shipment identifier. Particularly, the item data database 240 may be configured to store a unique RFID identifier in association with a unique item/shipment identifier. As should be appreciated, various embodiments may combine the functionality of the modules 230, 235 and/or the database 240 or may substitute one or more modules 230, 235 and/or databases 240 for other methods to incorporate the functionality described herein with respect to the modules 230, 235 and database 240.

Processing Exceptions

Figure 5:
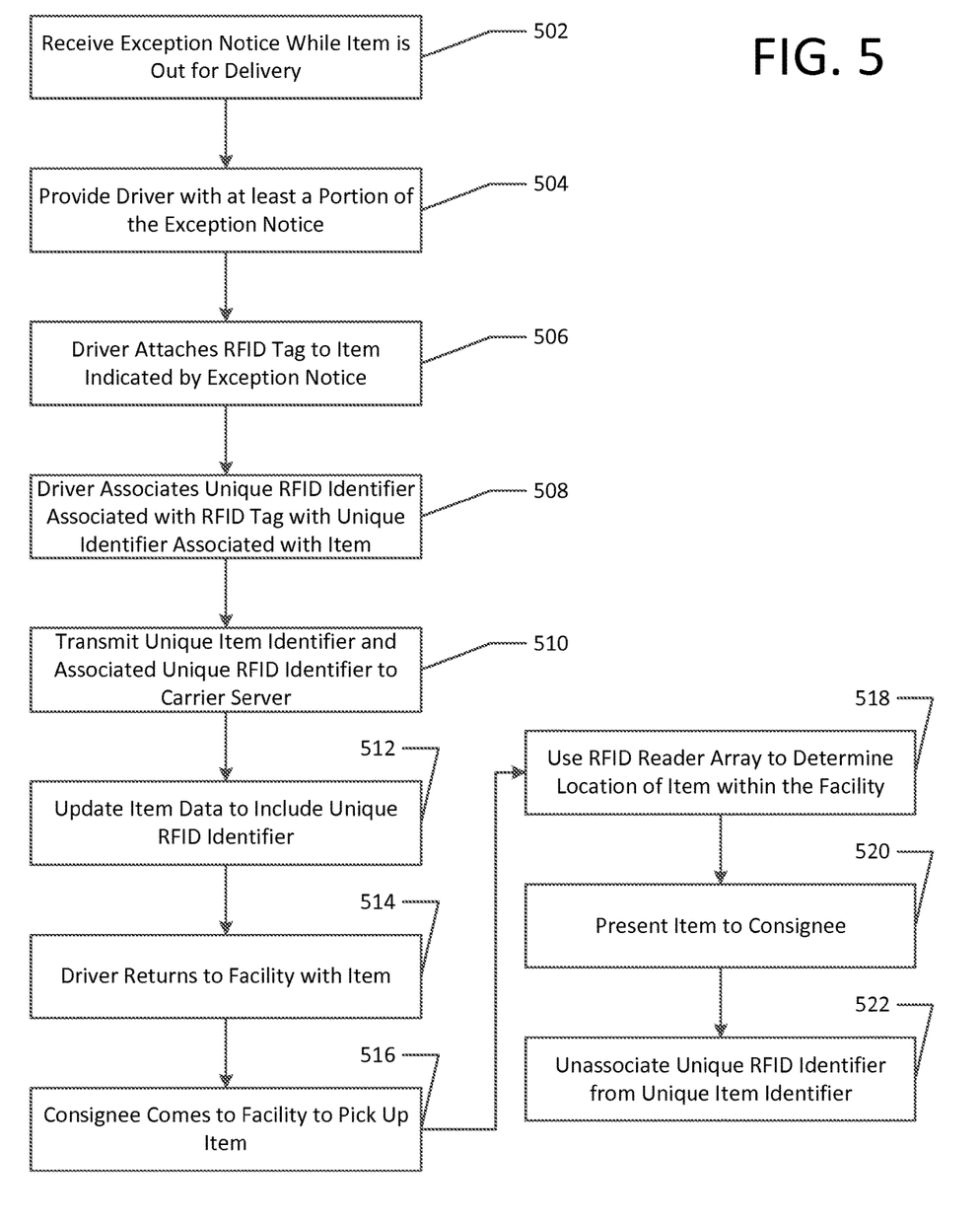
FIG. 5 is a flowchart illustrating a method for processing and handling an item associated with a delivery exception, in accordance with various embodiments of the present invention.

Various embodiments of the present invention may be used to process and handle a wide variety of delivery exceptions. FIG. 5 illustrates an embodiment in which the delivery exception is a consignee request to pick up the item from an alternate delivery location such as a facility associated with the carrier while the item is already out for delivery. The exception request may be received before or after a delivery attempt is made.

The example embodiment illustrated in FIG. 5 begins at step 502 with the receipt of a delivery exception request from the consignee. As noted above, this request may be received by the carrier system 200 (e.g., the Item Deliver Module 230) via a website while the item is out for delivery. For example, the item may be on a delivery vehicle that is already out completing the day's deliveries. In various embodiments, the carrier system 200 may receive the exception request via a consignee computing device 300 or by user input via an input device or a terminal in communication with the carrier system 200. For example, in various embodiments, a consignee (e.g., a consignee or consignee representative operating a Consignee Computing Device 300) may access a webpage or portal of a carrier, such as United Parcel Service of America, Inc. (UPS) and make an exception request. The webpage or portal of the carrier may be operated by carrier system 200 or a computing device in communication with the carrier system 200. The exception request may include a unique item/shipment identifier associated with the item for which the delivery exception is being requested, information identifying the consignee, information indicating the type of delivery exception (consignee will call pickup, hold delivery until tomorrow, etc.), instructions for completing the delivery exception, and/or other relevant information.

In various embodiments, at least a portion of the information contained in the exception request may be provided to the delivery vehicle driver, possibly via the driver computing device 100, at step 504. In some embodiments, the unique item/shipment identifier may be provided to the delivery vehicle driver. The driver may then identify the item indicated in the exception request. For example, the delivery vehicle driver may look in the item holding portion of the delivery vehicle and find the item associated with the unique item/shipment identifier or consignee identifying information indicated in the exception request.

At step 506 the delivery vehicle driver may attach an exception RFID tag to the item indicated by the exception request. In various embodiments, the item may already have an RFID tag attached to, embedded within, or otherwise physically associated with the item. In some such embodiments, the RFID tag that is already physically associated with the item may be used as the exception RFID tag. In other such embodiments, the delivery vehicle driver may attach another RFID tag to the item to be used as the exception RFID tag. In various embodiments, the exception RFID tag may be a passive or active RFID tag. In various embodiments, the exception RFID tag may be incorporated into a sticker that may be attached to the item. In some embodiments, the exception RFID tag may be incorporated into a reusable device, such that the device may be attached to one item and then removed and attached to another item. In various embodiments, the exception RFID tag may or may not be a writable RFID tag.

In various embodiments, the exception RFID tag may be associated with a unique RFID identifier, such that when the exception RFID tag is interrogated by an RFID reader, the identity of the tag may be determined. In various embodiments, the exception RFID tag may also have a barcode or other machine- or human-readable indicia printed thereon that encodes the unique RFID identifier or is associated with the unique RFID identifier. In other embodiments, a barcode or other machine- or human-readable indicia that encodes or is associated with the unique RFID identifier may be attached to the exception RFID tag in some other manner.

At step 508, the delivery vehicle driver may associate the unique RFID identifier associated with the exception RFID tag with the unique item/shipment identifier associated with the item. In various embodiments, the step of associating the unique RFID identifier and the unique item/shipment identifier comprises capturing both the unique RFID identifier and the unique item/shipment identifier using the driver computing device 100. For example, the driver computing device 100 may be used to scan a barcode associated with the exception RFID tag and scan a barcode on the item that encodes the unique item/shipment identifier and/or other item data. In other embodiments, the delivery vehicle driver may input a human-readable code encoding or associated with the unique RFID identifier and/or the unique item/ shipment identifier. In some embodiments, the driver computing device 100 may write at least a portion of the item data associated with the item, at least a portion of the information associated with the exception request, information identifying the delivery vehicle and/or delivery vehicle driver, the time at which the unique RFID identifier was associated with the unique item/shipment identifier and/or other information to the exception RFID tag. In other embodiments, the driver computing device 100 does not write information to the exception RFID tag.

At step 510 the driver computing device 100 may transmit the captured unique item/shipment identifier and the associated unique RFID identifier to the carrier system 200. After receiving the unique item/shipment identifier and the associated RFID identifier, or possibly in response thereto, the carrier system 200 may update the shipment data associated with the unique item/shipment identifier in the item data database 240, at step 512. For example, the carrier system 200 may store the unique RFID identifier in association with the unique item/shipment identifier and/or the shipment data associated with the unique item/shipment identifier in item data database 240 or some other database or storage location.

In various embodiments, the carrier system 200 (e.g., via the item delivery module 230) may provide the delivery vehicle driver with an updated delivery route and/or dispatch plan in response to a request from the delivery vehicle driver via the driver computing device 100 and/or in response to receiving the exception request. For example, the dispatch plan for the items that are located on the vehicle and that are to be delivered may be optimized based at least in part on the exception request and/or the shipment data associated with the items. The updated delivery route and/or dispatch plan may be provided to the delivery vehicle driver via the driver computing device 100. U.S. Pat. No. 7,624,024 entitled Systems and Methods for Dynamically Updating a Dispatch Plan, filed Apr. 18, 2005 provides a general description of dispatch plans and how these plans may be generated and updated. U.S. Pat. No. 7,624,024 is incorporated herein in its entirety by reference. The techniques described therein may be used in conjunction with embodiments of the present invention.

At step 514, the delivery vehicle may return to the facility associated with the carrier from which the vehicle left that morning and/or drop the item associated with the exception request off at another facility associated with the carrier (e.g., a UPS store, post office, or the like that is in a convenient location for the consignee to pick up the item) and that was indicated by the exception request. When the consignee arrives at the facility associated with the carrier where the item is located, the item locator module 235 may be used to determine the location of the item within the facility. The item locator module 235 shall now be described in detail below.

Locating the Items

The carrier system 200 (e.g., via the item locator module 235) may be configured to receive an item location request initiated by the customer service computing device 250 and/or to initiate an item location request based on information received via the customer service computing device 250 or via some other method. After receiving and/or initiating an item location request, or possibly in response thereto, the carrier system 200 (e.g., via the item locator module 235) may activate and/or trigger the RFID reader array 280 to detect the exception RFID tag associated with and attached to the item. The carrier system 200 (e.g., via the item locator module 235) may be further configured to use the detection of the exception RFID tag by one or more RFID readers 285 of the RFID reader array 280 to determine the location of the item within the facility and/or provide the location of the item within the facility, possibly via the customer service computing device 250.

Returning to FIG. 5, at step 516, the consignee, or a designated representative of the consignee, may arrive at the facility where the item is located. The consignee or representative of the consignee may provide the unique item/shipment identifier to identify the item to be retrieved. In various embodiments, the carrier may require the consignee (or representative of the consignee) to verify the consignee's identity prior to the retrieving the item. The carrier may verify the consignee's identity by viewing some form of personal identification, such as a passport or driver's license or by capturing or otherwise reviewing the unique identification provided by the carrier in an earlier communication (e.g., exception request confirmation, tracking notifications, etc.). The unique identification may be text, barcodes, Aztec Codes, MaxiCodes, Data Matrices, Quick Response (QR) Codes, electronic representations, and/or the like.

In an alternative embodiment, the carrier may validate the consignee's identity using an electronic card reader or other similar device known in the art. The carrier can swipe or scan any government issued form of identification using the electronic card reader or similar device.

In yet another embodiment, the consignee may present any form of identification to the carrier for verification. The carrier can then verify that the person requesting delivery is the intended consignee for the item.

At step 518, the RFID reader array 280 is used to determine the location of the item within the facility. An example process of determining the location of the item within the facility via the RFID reader array 280 is provided in FIG. 6. The exemplary process begins at step 602, the carrier system 200 (e.g., via the locator module 235) receives an item location request that may include the unique item/shipment identifier. The request may be received via the customer service computing device 250 and/or other input to the carrier system 200. Receiving the unique item/shipment identifier may allow the carrier system 200 (e.g., via item locator module 235) to determine the unique RFID identifier associated with the exception RFID tag to be detected by accessing the item data associated with unique item/shipment identifier. After receiving and/or initiating the item location request, or possibly in response thereto, the carrier system 200 (e.g., via item locator module 235) may activate the RFID reader array 280, at step 604.

Figure 6:
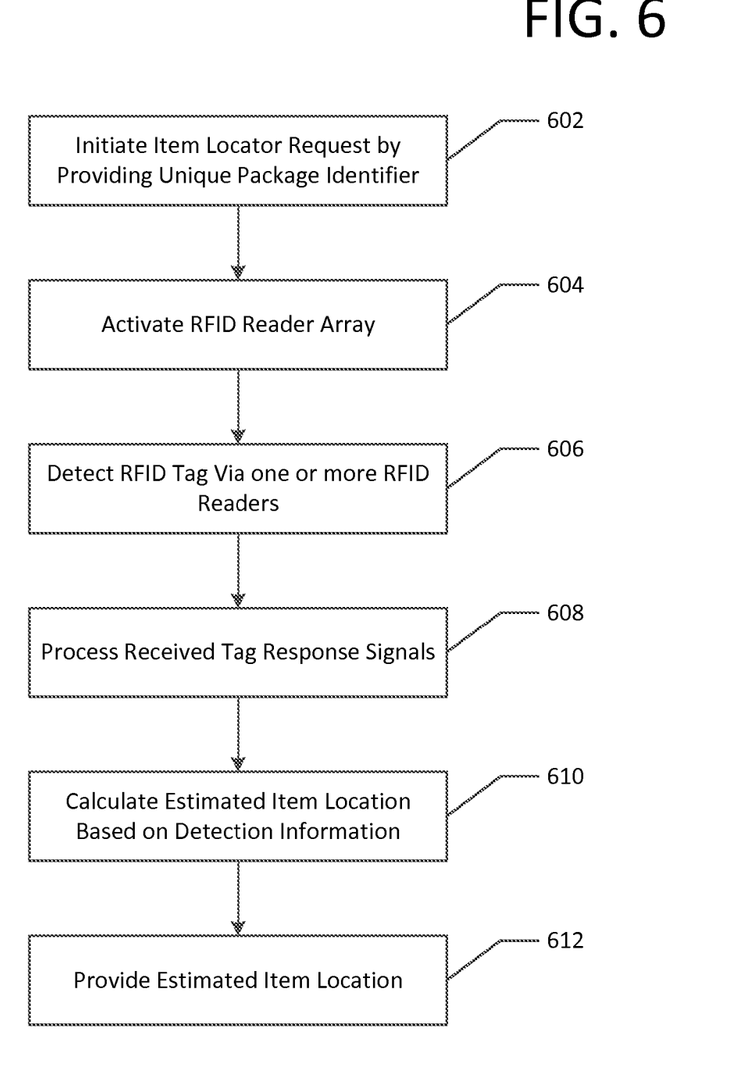
FIG. 6 is a flowchart illustrating a method for determining the location of an item within a facility using an RFID reader array, in accordance with various embodiments of the present invention.

The exception RFID tag attached to or otherwise associated with the item may be detected by one or more RFID readers 285 of the RFID reader array 280, at step 606. In various scenarios, only RFID reader 285A may detect the exception RFID tag attached to the item. In other scenarios, multiple RFID readers, such as, for example, 285A, 285B, and 285C may detect the exception RFID tag attached to the item. The tag response signals received by one or more RFID readers 285 from the exception RFID tag attached to or otherwise associated with the item may be processed, at step 608, to determine the tag response signal strength, delay between the transmission of the interrogating signal and the receipt of the tag response signal, and/or the like to determine the distance of the exception RFID tag attached to the item from each of the RFID readers 285 that detected the exception RFID tag attached to the item.

At step 610, the estimated location of the exception RFID tag, and therefore the item within the facility, or in a delivery vehicle located in the vicinity of the facility or associated with the facility, may be calculated. In various embodiments, the estimated location of the item may be based on the location of the RFID readers (e.g., 285A, 285B, and 285C) that detected the exception RFID tag attached to or otherwise associated with the item, and the determined distance from each of the RFID readers (e.g., 285A, 285B, and 285C), that detected the exception RFID tag attached to or otherwise associated with the item. In some embodiments, wherein the exception RFID tag is detected by three or more RFID readers 285, the item locator module 235 may use a triangulation algorithm to calculate the location of the exception RFID tag and the associated item.

If more than three RFID readers 285 detected the exception RFID tag, the detection information from the three RFID readers 285 that received the strongest tag response signal may be used to calculate the estimated location of the item within the facility via a triangulation algorithm, in some embodiments. In embodiments where only one or two RFID readers 285 detected the exception RFID tag, the detection information from the RFID readers 285 that did detect the exception RFID tag may be used alone or in concert with the location and known range of the RFID readers 285 that did not detect the exception RFID tag to determine the location of the item.

After calculating the estimated location of the item, or possibly in response thereto, the carrier system 200 (e.g., via item locator module 235) provides the estimated location of the item to the customer service clerk or other carrier personnel, possibly via the customer service computing device 250 and/or some other computing device in communication with the carrier system 200, at step 612. In various embodiments, the location of the item may be identified on a map of the area covered by the RFID reader array 280. For example, the display may provide an indication of which RFID readers communicated with the RFID tag associated with the item. The display may also have an indication of the read range for the particular RFID readers thereby providing an indication of where the item is located. If more than one RFID reader communicates with the RFID tag, the display may show the read ranges for all of the particular RFID readers or the overlap in read ranges. In some embodiments, the estimated location itself, as opposed to or in addition to the read ranges, may be provided on the map.

Returning to FIG. 5 at step 520, after the estimated item location is provided, the item may be retrieved and presented to the consignee or the designated representative of the consignee. In some embodiments, the exception RFID tag may be removed from the item before the item is presented to the consignee. In such embodiments, the exception RFID tag may be saved for reuse in the handling and processing of a future delivery exception.

At step 522, the unique RFID identifier may be unassociated with the unique item/shipment identifier. Particularly, this may be done if the exception RFID tag may be reused in the processing and handling of a future delivery exception. Various embodiments may not include step 522.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for managing item delivery by locating an item subject to an item delivery exception using radio frequency identification, the method comprising:
    activating a first radio frequency identification (RFID) reader array, the first RFID reader array including a first plurality of RFID readers, wherein activating the first RFID reader array causes the first plurality of RFID readers to broadcast a signal;
    responsive to an absence of the first RFID reader array detecting a response signal from an RFID tag corresponding to the item within a predetermined period of time, activating a second RFID reader array; and
    responsive to detection of the response signal from the RFID tag corresponding to the item by at least one RFID reader of the second RFID reader array, generating an estimated location of the item.

2. The method of claim 1, further comprising:
    determining that the at least one RFID reader_of the second RFID reader array is located in a delivery vehicle; and
    communicating, by a server and via at least one network, an updated delivery route to a driver computing device associated with the delivery vehicle.

3. The method of claim 1, wherein generating the estimated location of the item within a facility comprises:
    receiving, from the at least one RFID reader of the second RFID reader array, data indicating detection of the response signal from the RFID tag; and
    calculating a location of the item within the facility based at least in part on the received data.

4. The method of claim 1, further comprising communicating the generated location of the item to a client device for presentation.

5. The method of claim 1, wherein responsive to receiving an indication that the item was located, disassociating, by a server, the RFID tag from the item.

6. The method of claim 5, further comprising associating, by the server, the RFID tag with another item.

7. The method of claim 1, wherein the at least one RFID reader of the second RFID reader array is also included associated with a vehicle.

8. The method of claim 7, further comprising receiving an updated delivery route based at least in part on detection of the RFID tag.

9. A system for managing item delivery by locating an item using radio frequency identification, the system comprising:
    at least one processor; and
    computer storage memory having stored thereon computer readable instructions that when executed by the at least one processor, cause the at least one processor to perform operations comprising:
        activating a first sensor array, the first sensor array including a first plurality of RFID readers, wherein activating the first sensor array causes the first plurality of RFID readers to broadcast a signal;
        responsive to an absence of the first plurality of RFID readers detecting a response signal from a tag within a predetermined period of time, activating a second sensor array; and
        responsive to detection of the response signal from the tag by at least one sensor of the second sensor array, generating an estimated location of the item.

10. The system of claim 9, wherein the at least one sensor of the second array comprises radio frequency identification (RFID) readers.

11. The system of claim 9, wherein the operations further comprise providing the estimated location of the item to a remote computing device for display.

12. The system of claim 9, wherein the first plurality of sensors of the first sensor array are activated responsive to a request to locate the item associated with the tag.

13. The system of claim 12, wherein the operations further comprise:
responsive to receiving an indication that the item was located, disassociating the tag from the item.

14. The system of claim 13, wherein the operations further comprise:
associating the tag with another item.

15. A non-transitory computer product comprising at least one computer-readable storage medium having computer-readable instructions that when executed by one or more processors cause the one or more processors to perform operations comprising:
activating a first radio frequency identification (RFID) reader array, the RFID reader array including a first plurality of RFID readers, wherein activating the RFID reader array causes the RFID reader to broadcast a signal;
activating a second RFID reader array in response to an absence of the first RFID reader array detecting a response signal from an RFID tag corresponding to the item within a predetermined period of time; and
generating an estimated location of the item responsive to detection of the response signal from the RFID tag corresponding to the item by at least one RFID reader of the second RFID reader array.

16. The computer program product of claim 15, wherein the operations further comprise:
determining that the at least one RFID reader of the second RFID reader array is located in a delivery vehicle; and
communicating an updated delivery route to a driver computing device associated with the delivery vehicle.

17. The computer program product of claim 15, wherein the operations further comprise communicating the generated location of the item to a client device for presentation.

18. The computer program product of claim 15, wherein the operations further comprise disassociating the RFID tag from the item in response to receiving an indication that the item was located.

* * * * *

UNITED STATES PATENT AND TRADEMARK OFFICE
CERTIFICATE OF CORRECTION

PATENT NO. : 11,797,911 B2
APPLICATION NO. : 16/805396
DATED : October 24, 2023
INVENTOR(S) : Juan Perez It is certified that error appears in the above-identified patent and that said Letters Patent is hereby corrected as shown below:

In the Specification

Column 5, Line 51:
In the line reading "after an unsuccessful delivery attempt In some embodiments" should read --after an unsuccessful delivery attempt. In some embodiments--.

Column 8, Line 67:
In the line reading "processors, coproces sing entities, application-specific" should read --processors, coprocessing entities, application-specific--.

Column 9, Line 25:
In the line reading "which may comprise nonvolatile media (also referred to as" should read --which may comprise non-volatile media (also referred to as--.

Column 12, Line 40:
In the line reading "and nonvolatile storage or memory, an antenna, a transmit-" should read --and non-volatile storage or memory, an antenna, a transmit- --.

In the Claims

Column 20, Line 22, Claim 2:
In the line reading "determining that the at least one RFID reader_of the" should read --determining that the at least one RFID reader of the--.

Signed and Sealed this
Twenty-seventh Day of February, 2024

*Katherine Kelly Vidal*
Katherine Kelly Vidal
*Director of the United States Patent and Trademark Office*